(12) United States Patent
Chickering et al.

(10) Patent No.: US 8,966,075 B1
(45) Date of Patent: Feb. 24, 2015

(54) ACCESSING A POLICY SERVER FROM MULTIPLE LAYER TWO NETWORKS

(75) Inventors: Roger A. Chickering, Granite Bay, CA (US); Denzil Wessels, Campbell, CA (US)

(73) Assignee: Pulse Secure, LLC, San Jose, CA (US)

( * ) Notice: Subject to any disclaimer, the term of this patent is extended or adjusted under 35 U.S.C. 154(b) by 1090 days.

(21) Appl. No.: 11/772,469

(22) Filed: Jul. 2, 2007

(51) Int. Cl.
*G06F 15/177* (2006.01)
*G06F 15/173* (2006.01)
*G06F 15/16* (2006.01)

(52) U.S. Cl.
USPC ........... 709/225; 709/220; 709/221; 709/222; 709/223; 709/224; 709/226; 709/227; 709/228; 709/229

(58) Field of Classification Search
CPC . H01L 63/10; H01L 63/0272; H01L 12/5601; H01L 61/2015; H01L 61/10; H01L 29/12018; H01L 12/4645; H01L 63/0869; H01L 63/0892; H01L 63/102; H01L 63/164; H01L 63/02; H01L 63/08; H01L 63/162; H01L 63/20; G06F 21/577
USPC ......... 709/225, 220, 221, 222, 223, 224, 226, 709/227, 228, 229
See application file for complete search history.

(56) References Cited

U.S. PATENT DOCUMENTS

| | | | |
|---|---|---|---|
| 6,304,901 B1 * | 10/2001 | McCloghrie et al. | 709/221 |
| 6,539,019 B1 * | 3/2003 | Noy et al. | 370/395.53 |
| 6,553,028 B1 * | 4/2003 | Tang et al. | 370/389 |
| 6,741,592 B1 * | 5/2004 | Edsall et al. | 370/389 |
| 6,804,233 B1 * | 10/2004 | Congdon et al. | 370/389 |
| 6,914,905 B1 * | 7/2005 | Yip et al. | 370/395.53 |
| 6,944,130 B1 * | 9/2005 | Chu et al. | 370/238.1 |
| 7,143,435 B1 * | 11/2006 | Droms et al. | 726/3 |
| 7,420,979 B2 * | 9/2008 | Nozue et al. | 370/401 |
| 7,546,458 B1 * | 6/2009 | Singla et al. | 713/166 |
| 7,693,158 B1 * | 4/2010 | Carrie | 370/395.53 |
| 2001/0019554 A1 * | 9/2001 | Nomura et al. | 370/389 |
| 2005/0071446 A1 * | 3/2005 | Graham et al. | 709/223 |
| 2005/0111455 A1 * | 5/2005 | Nozue et al. | 370/392 |
| 2005/0114507 A1 * | 5/2005 | Tarui et al. | 709/224 |
| 2005/0163078 A1 | 7/2005 | Oba et al. | |
| 2005/0210288 A1 | 9/2005 | Grosse | |
| 2006/0034292 A1 * | 2/2006 | Wakayama et al. | 370/395.5 |
| 2006/0190721 A1 * | 8/2006 | Kawakami et al. | 713/161 |

(Continued)

OTHER PUBLICATIONS

IEEE, "802.1X™ IEEE Standard for Local and Metropolitan area networks, Post-Based Network Access Control," IEEE Computer Society, Dec. 13, 2004, 179 pp.

(Continued)

*Primary Examiner* — Rupal Dharia
*Assistant Examiner* — Mohammed Ahmed
(74) *Attorney, Agent, or Firm* — Shumaker & Sieffert, P.A.

(57) ABSTRACT

A network device, such as a policy server, supports a plurality of different layer two (L2) networks. The network device receives a request to initiate a communication session from an endpoint device, selects an L2 network to which to assign the endpoint device, and assigns the endpoint device to the selected L2 network, selects one of a plurality of L3 network addresses for the policy server based on the selected L2 network, and sends the L3 network address to the endpoint device. The network device also includes a monitoring module that monitors activities of the endpoint device, and a plurality of L2 network interfaces, wherein each L2 network interface is associated with at least one L2 network. The L2 networks may be virtual local area networks.

30 Claims, 5 Drawing Sheets

(56) References Cited

U.S. PATENT DOCUMENTS

| | | | |
|---|---|---|---|
| 2006/0209895 A1* | 9/2006 | Hirota | 370/469 |
| 2006/0212549 A1* | 9/2006 | Hokkyo et al. | 709/220 |
| 2006/0274768 A1* | 12/2006 | Suzuki et al. | 370/401 |
| 2006/0288406 A1 | 12/2006 | Kuhn et al. | |
| 2007/0006288 A1 | 1/2007 | Mayfield et al. | |
| 2007/0016679 A1* | 1/2007 | Mayfield et al. | 709/227 |
| 2007/0133576 A1* | 6/2007 | Tsuge et al. | 370/401 |
| 2007/0147318 A1* | 6/2007 | Ross et al. | 370/338 |
| 2007/0171870 A1* | 7/2007 | Oba et al. | 370/331 |
| 2007/0195780 A1* | 8/2007 | Cabeca et al. | 370/392 |
| 2007/0266422 A1 | 11/2007 | Germano et al. | |
| 2008/0101240 A1* | 5/2008 | Rohilla et al. | 370/236 |
| 2009/0028116 A1* | 1/2009 | Beser | 370/338 |
| 2009/0175276 A1* | 7/2009 | Tsuge et al. | 370/392 |
| 2012/0331530 A1* | 12/2012 | Chickering et al. | 726/4 |

OTHER PUBLICATIONS

Infoblox, "Implementing Policy-based Access Control in a Multi-vendor Environment Using IF-MAP," Solution Note, Jul. 2010, 3 pp.

Juniper, "Junos Pulse Access Control Service: Guide to IF-MAP Federation," Juniper Networks, Published Jan. 20, 2011, 56 pp.

Linfo, "MAC Address Definition, a unique hardware address" Linux Information Project, Sep. 15, 2008, 2 pp.

TCG, "Federated TNC," Trusted Computing Group, Revision 26, May 18, 2009, 41 pp.

TCG, "TNC Everywhere, Pervasive Security," Trusted Computer Group, 2009, 7 pp.

TCG, "TNCIF-MAP Binding for SOAP," Trusted Computing Group, Revision 6, May 18, 2009, 99 pp.

* cited by examiner

ACCESSING A POLICY SERVER FROM MULTIPLE LAYER TWO NETWORKS

TECHNICAL FIELD

The invention relates to computer networks, and, in particular, to computer network access control.

BACKGROUND

Enterprises and other organizations implement network access control in order to control the ability of endpoint devices to communicate on a computer network. For example, enterprises may designate separate virtual local area networks (VLANs) for different endpoints. Each VLAN provides connections between devices assigned to the VLAN. Each of the VLANs may essentially be treated as an independent layer two (L2) network. A device assigned to one VLAN can communicate with other devices on that VLAN but may be unable to communicate with devices on a separate VLAN. Packets for different VLANs may be correctly forwarded within a network by appending a VLAN tag to the packets to designate the VLAN to which each packet belongs. In some cases, a single network link may support traffic for multiple VLANs; such a network link is referred to as a "trunk" or "trunk link."

A policy server may be used to control access for the endpoint devices to the VLANs. Upon initial access to the network, the policy server may assign an endpoint to a particular VLAN based on certain characteristics, such as a particular user and the health posture of the endpoint. A physical layer-two (L2) switch may connect the endpoint devices to the policy server and to the VLAN based upon an assignment from the policy server. In some cases, a given endpoint may be assigned to one of any number of different L2 networks depending on a variety of factors at the time network access is initiated.

SUMMARY

In general, the invention is directed to techniques for enabling connection and ongoing communication between a plurality of endpoint devices and a policy server. More specifically, the techniques may be particularly useful in providing access control in a situation where a given endpoint may be assigned one of any number of different L2 networks. In such a situation, the techniques may be applied to ensure the endpoint is able to access a policy server from each of the available L2 networks.

For example, an endpoint device may initiate communication with a policy server through a switch of a network, such as an enterprise, in order to begin a communication session within one of a plurality of layer two (L2) (i.e., data link layer) networks, such as virtual local area networks (VLANs) within the network. Upon authentication of the endpoint, the policy server may assign the endpoint device to a particular layer 2 network (e.g., VLAN) based on one or more characteristics of the endpoint device and a user controlling the endpoint device.

In addition, the policy server maintains distinct configurations for the endpoint for each of the possible L2 networks. Furthermore, the policy server may maintain a distinct Internet Protocol (IP) address for each of the L2 networks to which the policy server is connected. During negotiation for an endpoint device to access one of the L2 networks, the policy server provides the endpoint with one of the IP addresses corresponding to the L2 network to which the policy server assigns the endpoint device so that the endpoint device can maintain communication with the policy server for the duration of the communication session. For example, after assignment to a particular VLAN, an endpoint device may require a particular IP address of the policy server within the VLAN to which the endpoint device is assigned in order to connect to and communicate with the policy server for the duration of the communication session.

In accordance with the techniques described herein, the policy server may send to the endpoint device the policy server's IP address corresponding to the VLAN to which the endpoint device is assigned. The policy server may send the IP address during negotiation, i.e., within a L2 setup communication sent when setting up the endpoint device on the VLAN. The endpoint device may then initiate layer three (L3) communication with the same policy server using the designated IP address. In this way, the policy server may preserve L3 communication with the endpoint device for the duration of the communication session in order to ensure compliance with one or more policies regarding an access level of the endpoint device. The L3 communication may provide a continuous, secure L3 control channel. Moreover, separate layer two networks can be securely maintained, and the policy server need not be assigned a single IP L3 network address that is routable across all of the L2 networks. In the event that the access level of the endpoint device changes, the policy server may issue a command to assign the endpoint to a different L2 network and may instruct the endpoint device to use a different IP address when communicating with the policy server.

In one embodiment, a method for providing access control to an endpoint from a policy server that supports a plurality of different layer two (L2) networks comprises receiving a request to initiate a communication session from an endpoint device, selecting, with the policy server, one of the plurality of L2 networks to which to assign the endpoint device, assigning the endpoint device to the selected L2 network, selecting one of a plurality of layer three (L3) network addresses for the policy server based on the L2 network to which the endpoint device is assigned, and sending the selected L3 network address to the endpoint device.

In another embodiment, a network device includes a negotiation module configured to receive a request to initiate a communication session from an endpoint device, to select a layer two (L2) network from among a plurality of L2 networks to which to assign the endpoint device, to assign the endpoint device to the selected L2 network, to select one of a plurality of layer three (L3) network addresses for the policy server based on the L2 network to which the endpoint device is assigned, and to send the L3 address to the endpoint device. The network device further includes a monitoring module configured to monitor activities of the endpoint device. The network device also includes a plurality of L2 network interfaces, wherein each of the L2 network interfaces is associated with at least one of the L2 networks. The L2 network interfaces may be separate physical network interfaces or they may be virtual network interfaces sharing one or more physical network interfaces. The L2 networks may be virtual local area networks (VLANs) and the L3 network address may be an IP address.

In another embodiment, a system includes an endpoint device, a policy server, and a L2 access device, such as a switch or access point. The policy server may include a negotiation module configured to receive a request to initiate a communication session from an endpoint device, to select a virtual local area network (VLAN) from among a plurality of VLANs to which to assign the endpoint device, to assign the endpoint device to the selected VLAN, to select one of a plurality of L3 addresses for the policy server based on the VLAN to which the endpoint device is assigned, and to send the L3 address to the endpoint device. The policy server may also include a monitoring module configured to monitor activities of the endpoint device, a plurality of VLAN interfaces, wherein each VLAN interface is associated with at least one VLAN and a user interface to permit an administrator to modify the policy server. The access device, which may be, e.g., a switch or an access point, may act as a proxy between the endpoint device and the policy server. The access device may be configured to connect the endpoint device to the policy server. The access device may receive at least one of wired or wireless communications.

In another embodiment, a computer-readable medium comprises instructions that cause a programmable processor receive a request to initiate a communication session from an endpoint device, select one of a plurality of virtual local area networks (VLANs) to which to assign the endpoint device, assign the endpoint device to the selected VLAN, select a L3 address based on the VLAN to which the endpoint device is assigned, send the L3 address to the endpoint device, and monitor configuration information and activity information of the endpoint device, wherein the endpoint device sends the configuration information and the activity information to the L3 address.

In a further embodiment, a network access device is connected to at least two layer two (L2) networks. The network access device is configured to receive Remote Authentication Dial-In User Service (RADIUS) messages from a policy server, to extract Extensible Authentication Protocol (EAP) messages from RADIUS attributes of the RADIUS messages, and to send the EAP messages to an endpoint device according to the 802.1X protocol, wherein at least one of the EAP messages contains an internet protocol (IP) address associated with one of the at least two L2 networks for the policy server to which the endpoint device is assigned by the policy server.

The techniques described herein may provide several advantages. For example, the techniques may be particularly useful in providing access control in situation where a given endpoint may be assigned one of any number of different L2 networks.

As another example, the policy server may monitor activities of the endpoint devices to ensure compliance with various policies. The policy server may detect a situation in which one or more of the endpoint devices initially complies with the policies associated with its assigned VLAN but later fails to comply with the policies. As another example, when the policies change or when one of the endpoint devices fails to comply with the policies, the policy server may immediately issue a command to assign the non-complying endpoint to a different VLAN, rather than waiting for the endpoint to end the current communication session and begin a new communication session. As yet another example, the techniques described herein may allow the endpoint device to access and maintain communication with the policy server dynamically, i.e., without requiring a customer to set up IP routing between all of the L2 networks and the policy server's network.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
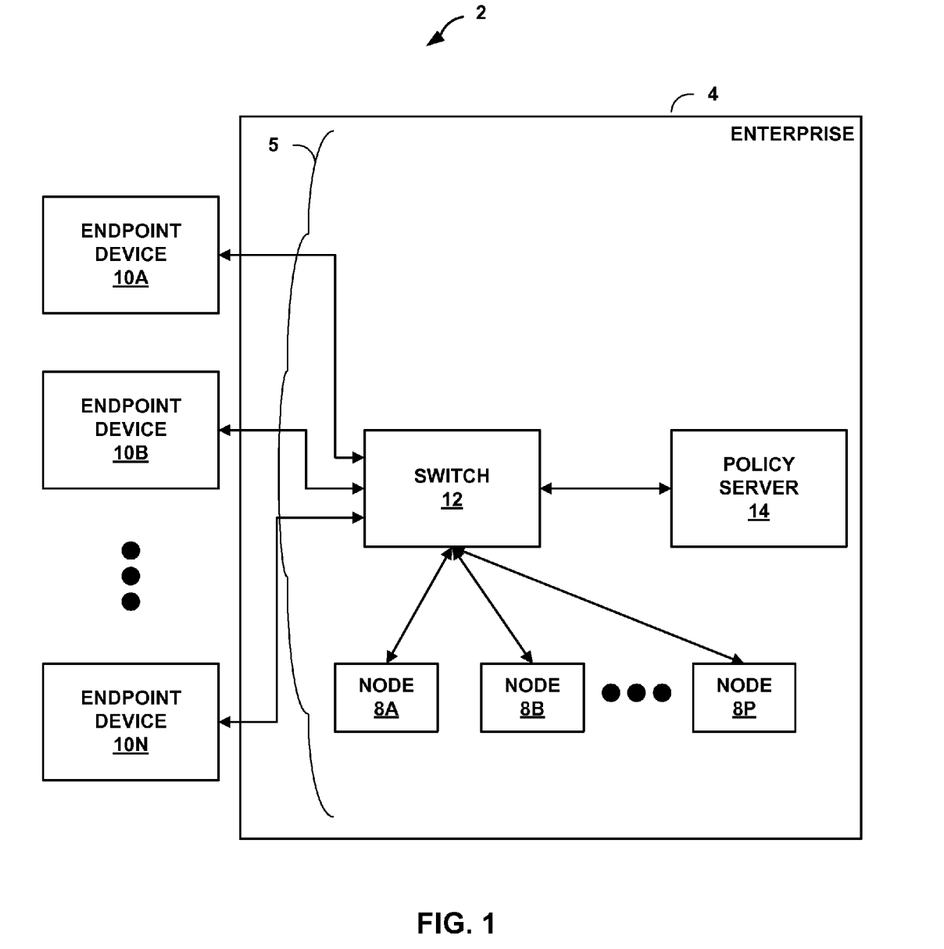
FIG. 1 is a block diagram illustrating an exemplary computer network environment.

FIG. 1 is a block diagram illustrating an exemplary system 2. In the example embodiment, system 2 includes enterprise computer network 4, which may include a secured, private network, and one or more endpoint devices 10A-10N ("endpoint devices 10").

In general, endpoint devices 10 may access a secured, private enterprise computing network 5. In the example of FIG. 1, network 5 includes nodes 8A-8P ("nodes 8"), switch 12, and policy server 14. Switch 12 and policy server 14 may be configured to support a plurality of different data link layer (layer two (L2)) networks. The L2 networks may be physically independent L2 networks, or may be logically independent virtual local area networks (VLANs). Endpoint devices 10 may be remote to enterprise network 5 or located with the enterprise network. Switch 12 may be any network access device, such as a wired switch or wireless access point. Generally, switch 12 may represent any L2 access device or a system of L2 access devices, such as a plurality of switches or wireless access points. Any of the access devices may permit wired access or wireless access. Switch 12 may be configured to receive messages from policy server 14 to assign endpoint devices 10 to specific L2 networks and to assign endpoint devices 10 accordingly.

Policy server 14 may be associated with of one or more of the L2 networks, e.g., multiple VLANs. Policy server 14 may use a distinct network layer address (layer three (L3) address), such as an internet protocol (IP) address, to identify policy server 14 for each of the VLANs of which policy server 14 is a member. Each of nodes 8 may likewise be part of one or more of the VLANs. Each of endpoint devices 10 may initially negotiate with policy server 14 for authentication, authorization and connection to network 5, and may be specifically assigned to one of the L2 networks, as discussed in further detail with respect to FIG. 2. To do so, endpoint devices 10 may negotiate with policy server 14 through switch 12. Switch 12 may act as a proxy between endpoint devices 10 and policy server 14 at layer two (L2) of the Open Systems Interconnection (OSI) networking model.

Endpoint devices 10 may negotiate with policy server 14 to begin a communication session with network 5 and to participate in one of the VLANs. Each of endpoint devices 10 may begin a communication session in order to, for example, communicate with other endpoint devices 10 or to communicate with particular nodes 8. Nodes 8 may be, for example, database servers, print servers, file servers, dynamic host configuration protocol (DHCP) servers, security management devices, or other network devices.

To establish a communication session, one of endpoint devices 10, e.g., endpoint device 10A, may initially negotiate with policy server 14. Upon authenticating and/or authorizing endpoint device 10A, policy server 14 may assign endpoint device 10A to a particular one of the L2 networks, e.g., one of the available VLANs. Policy server 14 may send a message to switch 12 to assign endpoint device 10A to a specific VLAN. After assignment, endpoint device 10A may remain in communication with policy server 14 for the duration of the communication session. To begin and maintain this communication, policy server 14 may send an L3 address, such as an IP address, of policy server 14 corresponding to the VLAN of which endpoint device 10A is a member, within an L2 communication during the negotiation. Policy server 14 may require that endpoint device 10A use the IP address to communicate with policy server 14 for the duration of the communication session. For example, policy server 14 may require periodic updates regarding activities of endpoint device 10A, configuration of endpoint device 10A, bandwidth usage of endpoint device 10A, or other characteristics of endpoint device 10A or the communication session. Likewise, policy server 14 may maintain such communications with each of endpoint devices 10. In this way, policy server 14 may maintain a continuous secure L3 control channel with each of endpoint devices 10.

Figure 2:
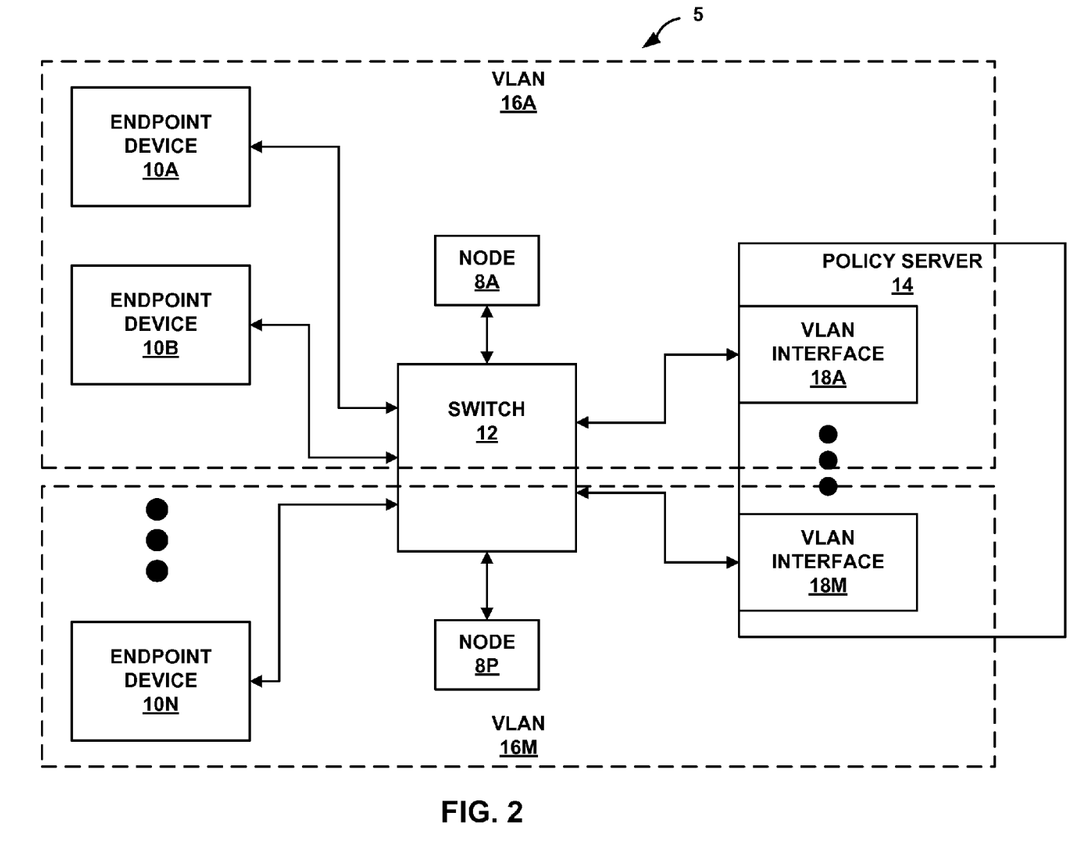
FIG. 2 is a block diagram illustrating an exemplary system including an example embodiment of a secured portion of an enterprise network.

FIG. 2 is a block diagram illustrating an exemplary system including an example embodiment of a secured portion of an enterprise network 5. Network 5 may comprise a plurality of L2 networks, such as virtual local area networks 16A-16M ("VLANs 16"). Endpoint devices 10 may negotiate with policy server 14 in order to join one of virtual local area networks 16A-16M ("VLANs 16") of network 5. Switch 12, which may be a high-speed Ethernet switch, is configured to forward traffic such that each device assigned to one of VLANs 16 may communicate with other devices within the same VLAN, but may not communicate with devices within another VLAN of which the device is not a member. Switch 12 may also be a wireless access point. In other embodiments, network 5 may include a plurality of switches, access points, which may provide wireless access to endpoint devices 10, or other network devices. Together, the plurality of switches, access points, and/or other devices may provide VLAN access across an enterprise network, for example, network 5.

In the example portrayed by FIG. 2, endpoint device 10A is assigned to VLAN 16A. Endpoint device 10B and node 8A are also members of VLAN 16A. Therefore, endpoint device 10A, endpoint device 10B, and node 8A may each communicate with each other. However, in this example, endpoint device 10A is not a member of VLAN 16M. Therefore, endpoint device 10A may not communicate with node 8P, which is a member of VLAN 16M. Although FIG. 2 portrays nodes 8 as belonging to a single one of VLANs 16, it is possible for particular nodes 8 to be a member of more than one of VLANs 16. Moreover, more than one node 8 may be a member of a VLAN. For example, node 8A and node 8P may each be members of VLAN 16A.

In this manner, switch 12, or a system of access devices such as switches, access points, or other access devices, may interconnect network devices that are connected to switch 12, e.g., nodes 8, endpoint devices 10, and policy server 14. Switch 12 may assign endpoint devices 10 to respective VLANs selected by policy server 14. Switch 12 may also preserve separation between various VLANs of network 5. In the example of FIG. 2, endpoint device 10A is a member of VLAN 16A, while endpoint device 10N is a member of VLAN 16M. Although both endpoint device 10A and endpoint device 10N are connected to switch 12, endpoint device 10A and endpoint device 10N typically cannot communicate with each other through switch 12 because the endpoint devices 10 are each members of distinct VLANs 16.

When processing and authenticating access requests from endpoint device 10, policy server 14 may assign each of endpoint devices 10 to one of VLANs 16 based on certain characteristics of endpoint devices 10. Policy server 14 may select a VLAN based on a set of policies, which may prescribe an access level for the characteristics of endpoint devices 10. In one embodiment, enterprise network 5 may use the Institute of Electrical and Electronics Engineers (IEEE) 802.1X protocol to implement network access control. The IEEE 802.1X standard controls initiation of communication between two network devices. The endpoint devices may initiate communication with switch 12 according to the IEEE 802.1X protocol. Switch 12 may serve as an intermediary between endpoint devices 10 and policy server 14 by sending messages received from endpoint devices to policy server 14 and sending messages received from policy server 14 to endpoint devices 10. In one embodiment, endpoint devices 10 may be configured to negotiate with policy server 14 using switch 12 as an intermediary according to the IEEE 802.1X protocol. During the negotiation, policy server 14 may select an L3 address to be provided to the endpoint devices 10 for subsequent communication over the selected VLAN. In one embodiment, policy server 14 may send a message that contains the selected L3 address, e.g., an IP address, to the negotiating endpoint device 10.

Policy server 14 may be configured to act as a Remote Authentication Dial-In User Service (RADIUS) server, e.g., to authenticate endpoint devices 10. Policy server 14 may utilize the Extensible Authentication Protocol (EAP) to authenticate endpoint devices 10, and endpoint devices 10 may utilize EAP to create authentication requests. In one embodiment, for example, policy server 14 may encapsulate an EAP message as a RADIUS message attribute and send the RADIUS message to switch 12; switch 12 may extract the EAP message from the RADIUS message and send the EAP message to the endpoint device, e.g., endpoint device 10A, using the 802.1X protocol. Policy server 14 may communicate the selected VLAN to switch 12 using a RADIUS Accept message. Switch 12 may include one or more interface cards for receiving and sending the messages, and may include a control unit for extracting the EAP messages from RADIUS attributes of the RADIUS messages and sending the extracted EAP messages according to the 802.1X protocol. The extracted EAP messages may include an L3 network address corresponding to the L2 network for the policy server to which the endpoint device is assigned by the policy server. Policy server 14 may communicate the L3 address in a separate EAP message and not necessarily attached to a RADIUS Accept message that assigns the endpoint device to a L2 network, e.g., a VLAN.

Endpoint devices 10 may comprise instructions to receive a L3 network address, such as an IP address, of policy server 14 from a message, e.g., an EAP message, sent by policy server 14 during negotiation. Endpoint devices 10 may maintain instructions in firmware, hardware, software, or any combination thereof. Each of endpoint devices 10 may also utilize the instructions to remain in communication with policy server 14 for the duration of the respective communication sessions. That is, endpoint devices 10 may be configured to send configuration information and activity information to the L3 address. Policy server 14 may retrieve and monitor this information to ensure that endpoint devices 10 are complying with respective policies. Policy server 14 may monitor the information for the duration of the respective communication sessions for endpoint devices 10.

In general, EAP provides an extensible framework for authentication and/or authorization of various network devices, e.g., endpoint devices 10. In accordance with the techniques as described herein, the extensible nature of EAP may be employed to provide a mechanism by which policy server 14 may transmit an L3 address, e.g. an IP address, to an endpoint device in an EAP message. Although described with respect to EAP, other protocols may be used to effect the transmission of one of a plurality of L3 addresses, wherein each of the plurality of L3 addresses corresponds to at least one L2 network, e.g., a VLAN, without departing from the principles of the invention.

Policy server 14 may assign an endpoint device, for example, endpoint device 10A, to a particular VLAN, for example, VLAN 16A, according to characteristics of endpoint device 10A. For example, policy server 14 may assign endpoint devices 10 to a particular VLAN 16 based on a user identity of each of endpoint devices 10 and a health posture or health information of the corresponding one of endpoint devices 10, such as up-to-date virus definitions, operating system patches, software updates, or other information. The health posture may include, for example, health information that represents a current security state of the endpoint being used. As another example, the health information may describe whether the endpoint device contains malicious software (e.g. a virus or spyware), whether the endpoint has invalid configuration, or whether the endpoint has installed approved countermeasures (e.g., anti-virus software). Moreover, health information may describe, as further examples, particular hardware or software of the endpoint device, such as whether particular software is present on or absent from the endpoint, whether particular data files are present on or absent from the endpoint, the contents of data files on the endpoint, registry settings of the endpoint, whether particular hardware is present on or absent from the endpoint, or any other aspect of the endpoint.

Policy server 14 may be a member of some or all of the L2 networks of network 5 (VLANs 16 in this example). For each VLAN 16 of which policy server 14 is a member, policy server 14 has a distinct L3 network address (an IP address in this example). In the example embodiment of FIG. 2, network 5 has M VLANs 16, and policy server 14 is a member of all M of the VLANs 16, thus policy server 14 maintains M IP addresses with which to identify itself to devices on the respective VLANs 16.

Policy server 14 may include one or more VLAN interfaces 18A-18M ("VLAN interfaces 18"). Each of VLAN interfaces 18 may communicate over a corresponding VLAN 16 of network 5. In one embodiment, discussed with respect to FIG. 3A, VLAN interfaces 18 may be virtual interfaces supported by one or more physical interfaces. In another embodiment, discussed with respect to FIG. 3B, VLAN interfaces 18 may be physical interfaces such as network interface cards (NICs). Switch 12 may a member of each of VLANs 16. Switch 12 may communicate traffic from each of VLANs 16 to policy server 14 through VLAN interfaces 18. In one embodiment, switch 12 may comprise at least one port operating in trunk mode, i.e. a "trunk port," wherein the trunk port connects to policy server 14 over one physical connection, e.g. a trunk link. The trunk port may communicate traffic for each of the VLANs to policy server 14 through virtual interfaces. In another embodiment, switch 12 may comprise a plurality of ports with which to communicate with policy server 14, wherein each of the ports correspond to at least one VLAN of network 5 and each of the ports is connected to a physical interface of policy server 14.

The example embodiment of secured network 5 illustrated in FIG. 2 may provide several advantages. For example, the techniques may be particularly useful in providing access control in situation where a given endpoint 10 may be assigned one of any number of different L2 networks (VLANs 16 in this example). The techniques provide for L3 connectivity for each of endpoint devices 10 to policy server 14 regardless of the L2 network to which policy server 14 has assigned each of endpoint devices 10.

In addition, policy server 14 may monitor activities of endpoint devices 10 to ensure continuous compliance with various policies. Policy server 14 may maintain a secure, continuous L3 access control channel with each of endpoint devices 10. When the policies change, policy server 14 may immediately issue a command to assign an endpoint device, for example, endpoint device 10A, to a different VLAN, for example, VLAN 16M rather than VLAN 16A. If an endpoint device 10 violates the assigned policy, e.g., by exceeding a bandwidth limitation, attempting to circumvent security, or other violations, policy server 14 may take an action such as restricting or eliminating access privileges of the endpoint device 10. Policy server 14 may also change the assignments of particular endpoint devices 10 to VLANs 16 without waiting for current communication sessions to end.

Although described with respect to 802.1X, other embodiments of the techniques described herein may utilize other protocols and methods to effect the transmission of one of a plurality of L3 addresses, wherein each of the L3 addresses corresponds to at least one L2 network without departing from the principles of the invention. For example, in an alternative embodiment, policy server 14 may be configured to verify MAC addresses of endpoint devices 10. Policy server 14 may include policies relative to the MAC addresses of endpoint devices 10.

When an endpoint device, such as endpoint device 10A, connects to network 5 for the first time, switch 12 may transmit the MAC address of endpoint device 10A to policy server 14. Policy server 14 may not recognize the MAC address of endpoint device 10A. Therefore, policy server 14 may assign endpoint device 10A to a particular L2 network, such as a quarantine VLAN. A quarantine VLAN may permit member endpoint devices 10 access to the policy server and remediation servers, but not the rest of network 5. A user (not shown) of endpoint device 10A may try to access, for example, a web browser of endpoint device 10A. A particular node 8, for example, node 8A, may be a member of the quarantine VLAN. Node 8A may intercept the web browser's attempt to access the web. Node 8A may then redirect the web browser of endpoint device 10A to policy server 14. Policy server 14, in turn, may deliver a particular page to the web browser of endpoint device 10A that includes an installer for agent software that can communicate with policy server 14. The user may then direct endpoint device 10A to install the agent software, and upon installation, endpoint device 10A may start the agent software.

The agent software may be configured to transmit the MAC address of endpoint device 10A, as well as health posture information, to policy server 14. Policy server 14 may use the MAC address and health information to assign endpoint device 10A to a different VLAN outside of the quarantine VLAN. That is, policy server 14 may direct switch 12 to change the assignment of endpoint device 10A to a different VLAN. Policy server 14 may also transmit an L3 address corresponding to the new, different VLAN to the endpoint device. The agent software may be configured to receive the L3 address and, upon reassignment to the new VLAN, remain in contact with policy server 14 using the L3 address for as long as endpoint device 10A is a member of the new VLAN.

Figure 3A:
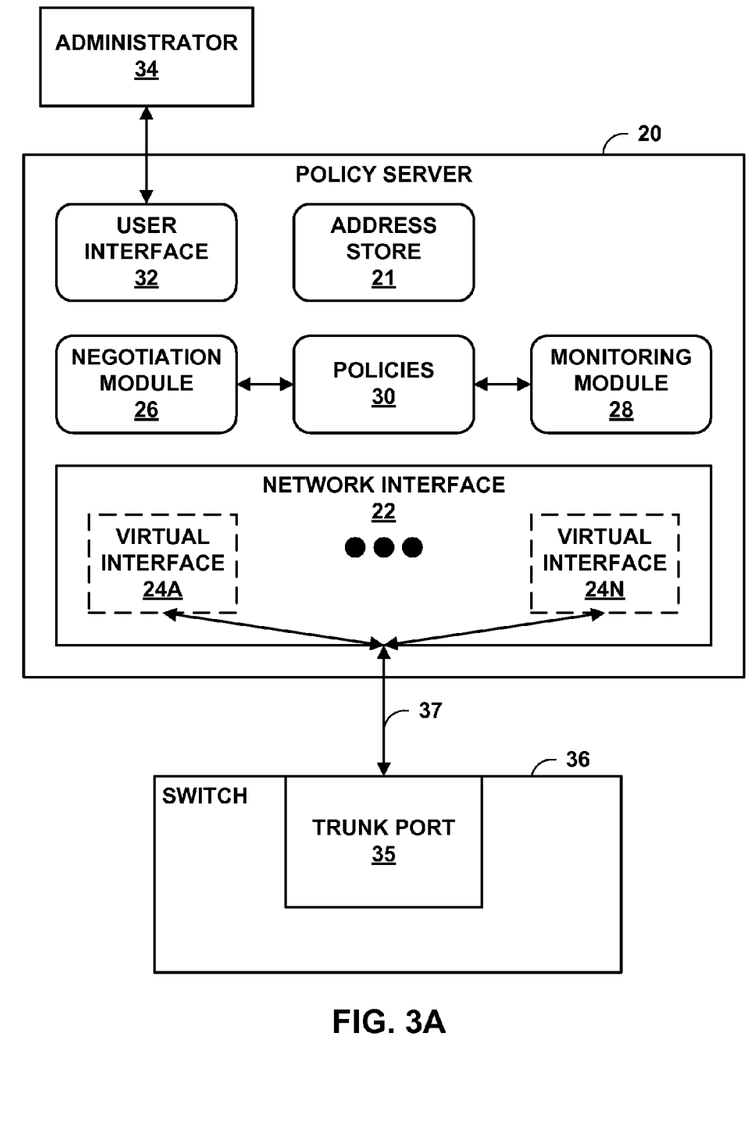
FIGS. 3A-3B are block diagrams illustrating example embodiments of a policy server.

FIG. 3A is a block diagram illustrating an example embodiment of a network device in the form of a policy server 20, which may perform functions similar to those performed by policy server 14 of FIGS. 1 and 2. In the example embodiment, policy server 20 includes address store 21, network interface 22, negotiation module 26, monitoring module 28, policies 30, and user interface 32.

Network interface 22 may comprise a plurality of virtual interfaces 24A-24N ("virtual interfaces 24") which may correspond to VLAN interfaces 18 of FIGS. 1 and 2. Network interface 22 may allow policy server 20 to communicate with switch 36. Switch 36 may perform substantially the same functions as switch 12 of FIGS. 1 and 2. Switch 36 may include a port operating in trunk mode, i.e., trunk port 35. Trunk port 35 may transmit data communication units, such as packets, associated with a plurality of VLANs over a single physical connection, i.e., trunked link 37, to network interface 22. A network device, such as policy server 20, may designate a packet as belonging to a particular VLAN 16 by incorporating VLAN tags in the packet. In one embodiment, trunk port 35 may be used to communicate traffic associated with the VLANs, and a separate connection may be used to transmit non-VLAN-associated communications, such as requests from endpoint devices 10 to initiate communication sessions, VLAN assignment messages to switch 36, or messages containing the L3 network address of policy server 20.

In the example embodiment, policy server 20 is "VLAN aware." That is, network interface 22 may receive packets belonging to any of the VLANs 16 of which policy server 20 is a member. Each of virtual interfaces 24 may interface with network devices associated with a particular VLAN. For example, virtual interface 24A may be associated with VLAN 16A (FIG. 2). Policy server 20 may also distinguish between the VLANs according to the VLAN tags incorporated in packets that policy server 20 receives. Moreover, policy server 20 may incorporate VLAN tags into a packet corresponding to the VLAN of which the destination device of the packet is a member.

Policy server 20 may associate each of virtual interfaces 24 with a unique IP address for its respective VLAN. Address store 21 may store each of the IP addresses and the association between each VLAN and its respective IP addresses. In one embodiment, address store 21 may comprise a look-up table to store the VLAN and corresponding IP address. Address store 21 may also store the relationship between virtual interfaces 24 and the respective VLANs. Policy server 20 may maintain address store 21 and policies 30 in the form of one or more tables, databases, linked lists, radix trees, databases, flat files, or any other data structures.

Upon receiving a packet associated with a particular VLAN, policy server 20 passes the packet to the proper virtual interface, for example, virtual interface 24A, according to the VLAN tags of the packet and address store 21. When policy server 20 needs to transmit a packet to a network device, for example, endpoint device 10A, policy server 20 may send the packet through the proper virtual interface, for example, 24A, associated with the VLAN to which endpoint device 10A is assigned.

Negotiation module 26 may receive a communication, such as an EAP message packaged as a RADIUS attribute within a RADIUS message, from an endpoint device such as endpoint device 10A, through switch 36 when endpoint device 10A attempts to initiate a communication session using policy server 20. The communication may include, for example, login information from a user, such as an identification and password, and/or health posture information of endpoint device 10A, such as, for example, up-to-date virus definitions, operating system patches, software updates, or other information. Negotiation module 26 may refer to policies 30 to determine a VLAN assignment for endpoint device 10A in response to the communication from endpoint device 10A. Negotiation module 26 may instruct switch 36 to assign endpoint device 10A to the selected VLAN. Policies 30 may include, for example, guidelines for assigning an endpoint device to one of VLANs 16 according to a user and health posture of endpoint devices 10. Administrator 34 may configure policies 30 via user interface 32. Negotiation module 26 may also be configured to send an L3 network address to the endpoint. For example, the L3 network address may be an IP address. For example, policy server 20 may include the L3 network address in an EAP message which the endpoint receives within the 802.1X protocol. Negotiation module 26 may send the L3 address in a separate EAP message and not necessarily attached to a RADIUS Accept message that assigns the endpoint device to a VLAN.

Negotiation module 26 may access address store 21 to retrieve an IP address corresponding to the VLAN to which endpoint device 10A has been assigned. Policy server 20 may send the IP address to endpoint device 10A. Endpoint device 10A may thereafter use the IP address to communicate with policy server 20 for the duration of the communication session. Monitoring module 28 may monitor the activities of endpoint devices 10 for the duration of each of the communication sessions of endpoint devices 10 to ensure that the activities comply with respective policies 30.

For example, in the event that policies 30 change with respect to an endpoint device, for example, endpoint device 10A, monitoring module 28 may assign endpoint device 10A to a different VLAN according to the change in policies 30. As another example, if monitoring module 28 identifies that the activities of an endpoint device, for example, endpoint device 10A, do not comply with policies 30, policy server 20 may, for example, end the communication session of endpoint device 10A, restrict the access of endpoint device 10A, reassign endpoint device 10A, and/or prevent endpoint device 10A from accessing network 5 in the future. Monitoring module 28 may also create and store a log of activities corresponding to endpoint devices 10. The log may include, for example, the time the communication session began, the time the communication session ended, total packets transferred during the communication session, volume of data transferred during the communication session, and/or reason for the end of the communication session.

User interface 32 provides an interface to a user such as administrator 34. User interface 32 may permit administrator 34 to, for example, view or modify policies 30, view the activity log from monitoring module 28, view or modify entries in address store 21, or perform other administrative activities.

Figure 3B:
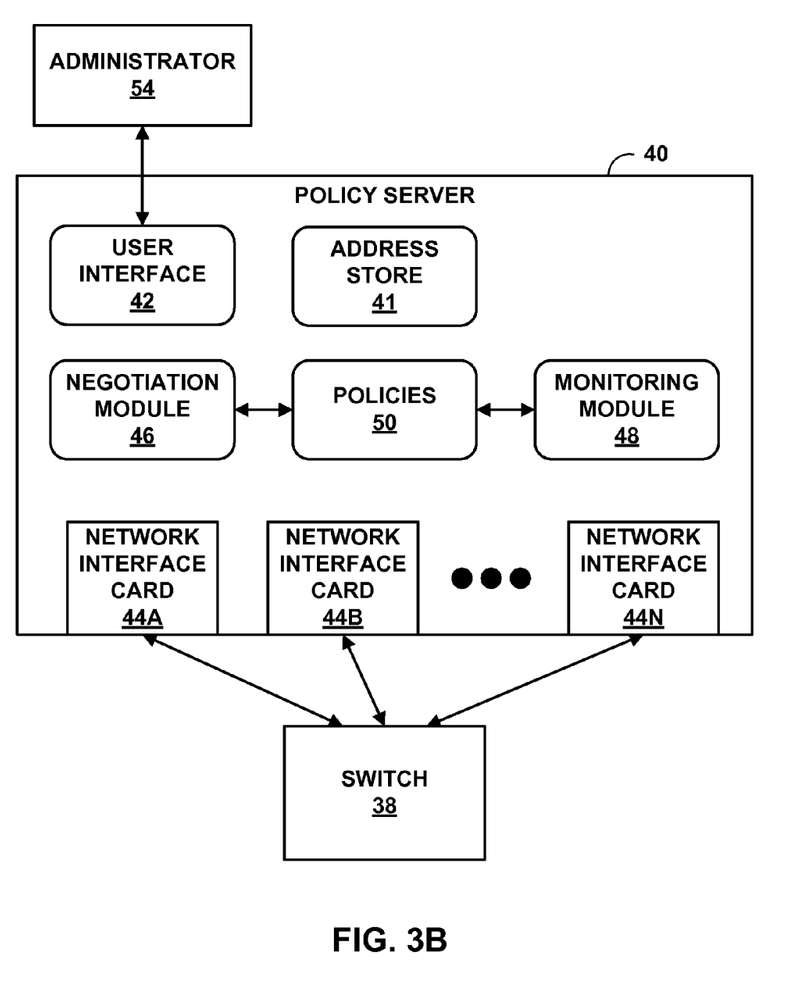

FIG. 3B is a block diagram illustrating another example embodiment of a network device in the form of a policy server 40, which may perform functions similar to those performed by policy server 14 of FIGS. 1 and 2. In the example embodiment, policy server 40 includes address store 41, user interface 42, one or more physical interfaces, portrayed as network interface cards (NICs) 44 in FIG. 3B, negotiation module 46, monitoring module 48, and policies 50. Although the example of FIG. 3B depicts physical interfaces as NICs, any physical network interface may be used without departing from the principles of the invention.

NICs 44 may correspond to VLAN interfaces 18 of FIGS. 1 and 2. Each of NICs 44 may communicate with a respective port of switch 38 (not shown). Switch 38 may perform substantially similar functions as functions performed by switch 12 of FIGS. 1 and 2. Each of NICs 44 may be associated with one or more of VLANs 16. In the example embodiment, switch 38 may direct traffic from respective VLANs to corresponding NICs 44 of policy server 40. User interface 42 may permit administrator 54 to manually configure NICs 44. That is, administrator 54 may manually assign each of NICs 44 to a corresponding VLAN. Policy server 40 does not necessarily need to be VLAN aware, as traffic from each VLAN will arrive at the corresponding one of NICs 44. One or more of NICs 44 may also handle data communication units which do not belong to any of the VLANs. Any of NICs 44 may also handle data communication with switch 38 when switch 38 is serving as intermediary between endpoint devices and policy server 40. In some embodiments, one of NICs 44 may be connected to a plurality of VLANs.

Each of NICs 44 may be assigned a unique IP address. Address store 41 may store each of the IP addresses and the association between each NIC 44 and its respective IP address. In one embodiment, address store 41 may comprise a look-up table to store the NIC and corresponding IP address. Policy server 40 may maintain address store 41 and policies 50 in the form of one or more tables, databases, linked lists, radix trees, databases, flat files, or any other data structures.

Negotiation module 46 may receive a communication, such as an EAP message packaged as a RADIUS attribute within a RADIUS message, from an endpoint device, such as endpoint device 10A, through switch 38 when endpoint device 10A attempts to initiate a communication session. The communication may include, for example, login information from a user, such as an identification and password, and health posture information of endpoint device 10A, such as, for example, up-to-date virus definitions, operating system patches, software updates, or other information. Negotiation module 46 may refer to policies 50 to determine a VLAN assignment for endpoint device 10A in response to the communication from endpoint device 10A. Negotiation module 46 may instruct switch 38 to assign endpoint device 10A to the selected VLAN. Policies 50 may include, for example, VLAN assignments based on a user and health posture of endpoint devices 10. Administrator 54 may configure policies 50 via user interface 42. In one embodiment, negotiation module 46 sends to an endpoint device 10 an L3 address, such as an IP address. For example, policy server 20 may include the L3 address in an EAP message packaged as a RADIUS attribute within a RADIUS message. Negotiation module 46 may send the L3 address in a separate EAP message and not necessarily attached to a RADIUS Accept message that assigns the endpoint device to a VLAN.

Negotiation module 46 may access address store 41 to retrieve an IP address corresponding to the VLAN to which endpoint device 10A has been assigned. Policy server 40 sends the IP address to endpoint device 10A. Endpoint device 10A may be configured to receive the IP address from negotiation module. Endpoint device 10A may thereafter use the IP address to communicate with policy server 40 for the duration of the communication session. Monitoring module 48 may monitor the activities of endpoint devices 10 for the duration of each of the communication sessions of endpoint devices 10 to ensure that the activities comply with respective policies 50.

In the event that policies 50 change with respect to an endpoint device, for example, endpoint device 10A, monitoring module 48 may assign endpoint device 10A to a different VLAN according to the change in policies 50. Likewise, if monitoring module 48 identifies that the activities of an endpoint device 10 do not comply with policies 50, policy server 40 may, for example, end the communication session of the endpoint device 10, restrict the access of the endpoint device 10, reassign the endpoint device 10, and/or prevent the endpoint device 10 from accessing network 5 in the future. Monitoring module 48 may also create and store a log of activities corresponding to endpoint devices 10. The log may include, for example, the time the communication session began, the time the communication session ended, total packets transferred during the communication session, volume of data transferred during the communication session, and/or reason for the end of the communication session.

User interface 42 provides an interface to a user such as administrator 54. User interface 42 may permit administrator 54 to, for example, view or modify policies 50, view the activity log from monitoring module 48, view or modify entries in address store 41, or perform other administrative activities.

Each of NICs 44 may also have multiple physical connections to switch 38. Each of NICs 44 may correspond to one or more VLANs. Administrator 54 may configure policy server 40 to recognize multiple VLANs for each of NICs 44.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor. Accordingly, this disclosure also contemplates a computer-readable medium comprising instructions that upon execution cause the device to perform techniques as described in this disclosure. In some cases, the computer readable medium may form part of a computer program product comprising computer readable media.

Figure 4:
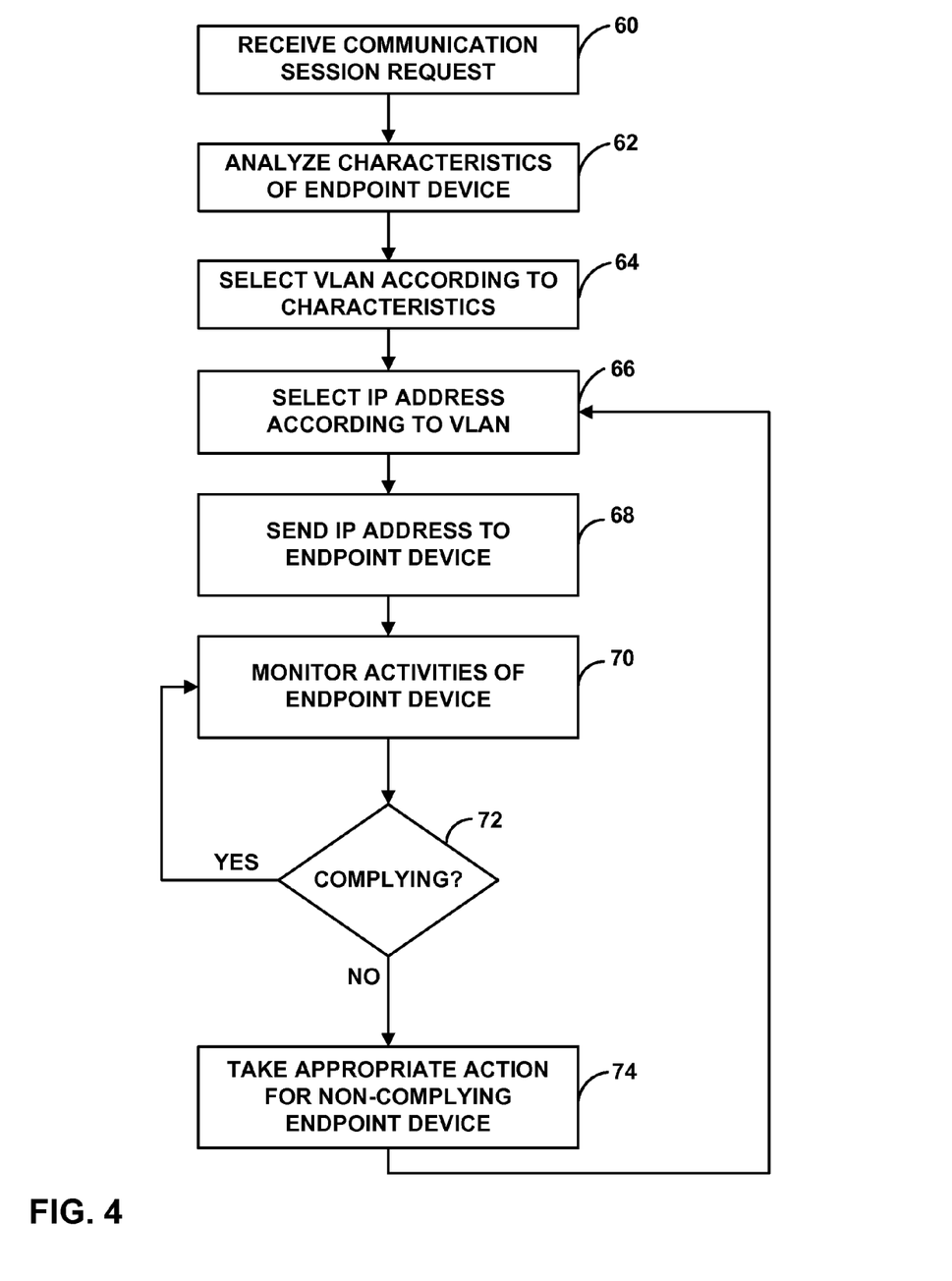
FIG. 4 is a flowchart illustrating an example procedure for initiating a communication session.

FIG. 4 is a flowchart illustrating an example procedure for initiating a communication session. Each of endpoint devices 10, in one embodiment, may initiate a communication session according to the example of FIG. 4. For purposes of example, the description of FIG. 4 will focus on the initiation of a communication session for endpoint device 10A of FIGS. 1 and 2 from the perspective of policy server 14.

Initially, endpoint device 10A transmits a request to access the network to begin a communication session. The request may occur, for example, when endpoint device 10A powers up, during a user login, or after a user login. The request may be transmitted through switch 12. The request may consist of one or more 802.1X messages. Switch 12 may package the request and send the request to policy server 14. Policy server 14 may receive the request from endpoint device 10A through switch 12 (60). Policy server 14 may be configured to act as a RADIUS server to authenticate endpoint device 10A. Policy server 14 may analyze characteristics of endpoint device 10A based on the request, such as a user login ID and password and the health posture of endpoint device 10A (62), such as up-to-date virus definitions, operating system patches, software updates, or other information. Policy server 14 selects a VLAN for endpoint device 10A according to the characteristics and assigns endpoint device 10A to that VLAN (64). Policy server 14 may select the VLAN according to a set of policies maintained by policy server 14. The policies may describe, for example, levels of access and to which VLAN or VLANs endpoint devices may be assigned to based on the characteristics.

In one embodiment, policy server 14 may comprise a plurality of virtual interfaces, one virtual interface for each VLAN of the network. Switch 12 may comprise a trunk port to communicate with policy server 14. In another embodiment, policy server 14 may comprise a plurality of physical interfaces, such as network interface cards (NICs), each of which is connected to one or more ports of switch 12. Each of these connections may represent one VLAN of the network. Policy server 14 may associate a unique IP address with each VLAN of the network. Policy server 14 may select the IP address corresponding to the VLAN to which policy server 14 assigned endpoint device 10A (66).

To do so, policy server 14 may send the IP address corresponding to the VLAN to which endpoint device 10A was assigned to endpoint device 10A (68). Endpoint device 10A may comprise software that enables endpoint device 10A to receive and store the IP address of policy server 14. In this manner, policy server 14 may maintain a secure L3 access channel with endpoint device 10A after sending the IP address to endpoint device 10A.

Endpoint device 10A may obtain an IP address to serve as an address for endpoint device 10A, for example, from a DHCP server. Thereafter, endpoint device 10A may commence layer three (L3) communication. Endpoint device 10A may use the IP address from the DHCP server as a source address and the IP address obtained from the L2 communication by policy server 14 as the destination address for communicating with policy server 14. The DHCP server may be one of nodes 8. The DHCP server may be either global to the network, i.e., may be associated with each of VLANs 16, or there may be a unique DHCP server for each of VLANs 16.

Policy server 14 may monitor the activities of endpoint device 10A (70) to ensure that the activities comply with the policy assigned to endpoint device 10A, for example by sending requests for data to endpoint device 10A. Endpoint device 10A may use the IP address of policy server 14 as the destination address for which to send responses to the requests to policy server 14 as a part of the monitoring by policy server 14. Policy server 14 may send requests for the activities of endpoint device 10A to the IP address associated with endpoint device 10A.

While monitoring the activities of endpoint devices 10, policy server 14 may determine whether each of endpoint devices 10 continue to comply with policies corresponding to respective endpoint devices 10 (72). If an endpoint device is complying with the policies ("YES" branch of 72), then policy server 14 may continue to monitor the activities. Policy server 14 may determine that a particular endpoint device, such as endpoint device 10A, is not complying with the policies for a variety of reasons. In some situations, the policies maintained by policy server 14 may change during a communication session. For example, an administrator may update the policies. An endpoint device, such as endpoint device 10A, may also perform an action which causes policy server 14 to modify the policy assigned to endpoint device 10A. For example, endpoint device 10A may exceed a bandwidth limit, i.e., a threshold volume of traffic. If an endpoint device such as endpoint device 10A is not complying with the policies ("NO" branch of 72), policy server 14 may provision the access of endpoint device 10A. Policy server 14 may, for example, check whether the permitted access has changed, e.g., because the policies have changed, or determine whether an endpoint device has violated the assigned policy (74). Policy server 14 may also determine whether an endpoint device should be assigned a different access or policy, e.g., whether policy server 14 should assign the non-complying endpoint device to a different VLAN or should remove the non-complying endpoint device from the network entirely.

If policies have changed, policy server 14 may check each endpoint device to determine whether the endpoint device should be reassigned. For example, endpoint device 10A may have been assigned to a policy which has changed. Due to the policy modification, endpoint device 10A may no longer be in compliance. In response to the policy modification, policy server 14 may assign endpoint device 10A to a different VLAN (74), select the IP address corresponding to that VLAN (66), send endpoint device 10A the new IP address (68), and again monitor the activities of endpoint device 10A (70). Endpoint device 10A may receive the new IP address and use the new IP address to communicate with policy server 14. If the policies have not changed, policy server 14 may determine an appropriate action to take, such as restricting the access of endpoint device 10A (74).

Various embodiments of the invention have been described. These and other embodiments are within the scope of the following claims.

The invention claimed is:

1. A method for providing access control to an endpoint from a policy server that supports a plurality of different layer two (L2) networks, the method comprising:

maintaining, with the policy server, a plurality of layer three (L3) network addresses, wherein each of the plurality of L3 network addresses provides a destination address of the policy server for use as the destination address of the policy server when communicating with the policy server, and wherein each of the plurality of L3 network addresses is associated with one or more of the plurality of L2 networks;

receiving, with the policy server, a request to initiate a communication session from an endpoint device;

in response to receiving the request from the endpoint device, authenticating and authorizing, with the policy server, the endpoint device;

after authenticating and authorizing the endpoint device, selecting, with the policy server, one of the plurality of L2 networks to which to assign the endpoint device;

sending, with the policy server, a communication to an access device to assign the endpoint device to the selected L2 network;

selecting, with the policy server, one of the plurality of L3 network addresses as the destination address of the policy server based on which one of the plurality of the L2 networks the endpoint device is assigned;

sending, with the policy server, a communication in accordance with an Authentication, Authorization, and Accounting (AAA) protocol that includes a message as an attribute of the communication, wherein the message identifies the selected L3 network address to the endpoint device;

receiving, with the policy server, configuration information and activity information from the endpoint device sent to the selected L3 network address;

monitoring, with the policy server, the configuration information and the activity information of the endpoint device for the duration of the communication session; and after determining, with the policy server, that a policy for the endpoint device has changed or that the endpoint device violates the policy for the endpoint device, modifying access privileges of the endpoint device.

2. The method of claim 1, wherein sending the selected L3 network address comprises sending the selected L3 network address to the endpoint device within an L2 communication.

3. The method of claim 2, further comprising receiving the L2 communication containing the selected L3 network address with the endpoint device using the 802.1X protocol.

4. The method of claim 1, wherein the L3 network address is an Internet Protocol (IP) address routable with the L2 network to which the endpoint device is assigned.

5. The method of claim 1, wherein assigning the endpoint device to a L2 network comprises assigning the endpoint device to a virtual local area network (VLAN).

6. The method of claim 1, wherein selecting one of the plurality of L2 networks comprises:

analyzing characteristics of the endpoint device; and
selecting a policy corresponding to the characteristics.

7. The method of claim 6, wherein analyzing characteristics comprises analyzing at least one of user authentication credentials, a user identification, a user password, and a health posture of the endpoint device, wherein the health posture comprises information regarding at least one of virus definitions, operating system patches, malicious software, viruses, spyware, configuration, countermeasures, anti-virus software, whether particular software is present on or absent from the endpoint device, whether particular data files are present on or absent from the endpoint device, the contents of data files on the endpoint device, registry settings of the endpoint device, or whether particular hardware is present on or absent from the endpoint device.

8. The method of claim 1, further comprising provisioning access of the endpoint device with respect to the one of the plurality of L2 networks according to policies on the policy server as applied to the configuration information and the activity information received from the endpoint device.

9. The method of claim 8, wherein provisioning comprises assigning the endpoint device to a different one of the L2 networks.

10. The method of claim 1, further comprising:
communicating L3 messages with the endpoint device through a trunk port of an access device.

11. The method of claim 1, further comprising
associating a physical interface of the policy server with each of the L2 networks; and
communicating with the endpoint device by transmitting packets intended for the endpoint device through the physical interface associated with the L2 network to which the endpoint device is assigned,
wherein receiving the request comprises receiving the request through one of the physical interfaces.

12. A network device comprising:
an address store configured to store a plurality of layer three (L3) network addresses, wherein each of the plurality of L3 network addresses provides a destination address of the network device for use as the destination address of the network device when communicating with the network device, and wherein each of the plurality of L3 network addresses is associated with one or more of a plurality of layer two (L2) networks;
a negotiation module configured to receive a request to initiate a communication session from an endpoint device, in response to receiving the request from the endpoint device, to authenticate and authorize the endpoint device, to select, after authenticating and authorizing the endpoint device, an L2 network from among the plurality of L2 networks to which to assign the endpoint device, to send a communication to an access device to assign the endpoint device to the selected L2 network, to select one of the plurality of L3 network addresses as the destination address for the network device based on which one of the plurality of the L2 networks the endpoint device is assigned, and to send a communication in accordance with an Authentication, Authorization, and Accounting (AAA) protocol that includes a message as an attribute of the communication, wherein the message identifies the selected L3 address to the endpoint device;
a monitoring module configured to monitor activities of the endpoint device, wherein the monitoring module is configured to receive configuration information and activity information from the endpoint device sent to the selected L3 network address, to monitor the configuration information and the activity information of the endpoint device for the duration of the communication session, and to modify access privileges of the endpoint device after determining that a policy for the endpoint device has changed or that the endpoint device violates the policy for the endpoint device; and
a plurality of L2 network interfaces, wherein each of the L2 network interfaces is associated with at least one of the L2 networks.

13. The network device of claim 12, wherein the communication in accordance with the AAA protocol comprises a Remote Authentication Dial-In User Service (RADIUS) communication that includes an Extensible Authentication Protocol (EAP) message as a RADIUS attribute.

14. The network device of claim 12, wherein the L3 network address comprises an internet protocol (IP) address routable with the L2 network to which the endpoint device is assigned.

15. The network device of claim 12, wherein the L2 network comprises a virtual local area network (VLAN).

16. The network device of claim 12, wherein each of the plurality of L2 network interfaces comprises a virtual interface.

17. The network device of claim 16, further comprising a switch interface to send and receive messages over a trunk link connected to a trunk port of a switch, wherein the trunk link comprises a single connection capable of transmitting messages from a plurality of L2 networks.

18. The network device of claim 12, wherein each of the plurality of L2 network interfaces comprises a physical interface.

19. The network device of claim 18, wherein the physical interfaces are network interface cards (NICs).

20. The network device of claim 18, wherein at least one of the physical interfaces is connected to more than one L2 network.

21. The network device of claim 12, further comprising a set of policies, wherein the negotiation module is configured to select a policy from the set of policies for the endpoint device according to the characteristics.

22. The network device of claim 21, wherein the monitoring module is configured to receive data corresponding to the activities of the endpoint device and to check the data against the selected policy for the endpoint device.

23. The network device of claim 12, further comprising a user interface to permit an administrator to modify the configuration of the network device.

24. The network device of claim 23,
wherein each of the plurality of L2 network interfaces comprises a physical interface, and
wherein the user interface is configured to permit the administrator to manually configure each of the physical interfaces to associate each of the physical interfaces with at least one L2 network.

25. The network device of claim 24, wherein the user interface is configured to permit the administrator to assign a L3 address for the network device to at least one of the L2 network interface.

26. A non-transitory computer-readable medium comprising instructions for causing a programmable processor of a policy server to:
maintain a plurality of layer three (L3) network addresses, wherein each of the plurality of L3 network addresses provides a destination address of the policy server for use as the destination address of the policy server when communicating with the policy server, and wherein each of the plurality of L3 network addresses is associated with one or more of a plurality of virtual local area networks (VLANs);

receive a request to initiate a communication session from an endpoint device; in response to receiving the request from the endpoint device, authenticate and authorize the endpoint device;

after authenticating and authorizing the endpoint device, select one of the plurality of VLANs to which to assign the endpoint device;

send a communication to an access device to assign the endpoint device to the selected VLAN;

select one of the plurality of L3 addresses as the destination address of the policy server based on which one of the plurality of the VLANs the endpoint device is assigned;

send a communication in accordance with an Authentication, Authorization, and Accounting (AAA) protocol that includes a message as an attribute of the communication, wherein the message identifies the selected L3 address to the endpoint device;

receive configuration information and activity information from the endpoint device sent to the selected L3 network address;

monitor the configuration information and the activity information of the endpoint device for the duration of the communication session; and after determining that a policy for the endpoint device has changed or that the endpoint device violates the policy for the endpoint device, modify access privileges of the endpoint device.

27. The non-transitory computer-readable medium of claim 26, wherein the request is in the form of an extensible authentication protocol (EAP) request, packaged in a Remote Authentication Dial-In User Service (RADIUS) attribute of a RADIUS message, wherein the L3 address comprises an internet protocol (IP) address, and wherein the processor sends the IP address to the endpoint device within an EAP message.

28. The method of claim 1, wherein modifying the access privileges of the endpoint device comprises at least one of assigning the endpoint device to a different one of the plurality of L2 networks, restricting the access privileges of the endpoint device, or eliminating the access privileges of the endpoint device.

29. The method of claim 1, wherein the communication in accordance with the AAA protocol comprises a Remote Authentication Dial-In User Service (RADIUS) communication that includes an Extensible Authentication Protocol (EAP) message as a RADIUS attribute.

30. The non-transitory computer-readable medium of claim 26, wherein the communication in accordance with the AAA protocol comprises a Remote Authentication Dial-In User Service (RADIUS) communication that includes an Extensible Authentication Protocol (EAP) message as a RADIUS attribute.

* * * * *